US010013232B2

(12) United States Patent
Hostage et al.

(10) Patent No.: US 10,013,232 B2
(45) Date of Patent: Jul. 3, 2018

(54) WIRELESS SPEAKER CONNECTION MANAGEMENT

(71) Applicant: Bose Corporation, Framingham, MA (US)

(72) Inventors: Christine M. Hostage, Southborough, MA (US); Naganagouda B. Patil, Ashland, MA (US); Keith D. Martin, Westborough, MA (US); David Paul Datta, Worcester, MA (US); Nathan Holstein, Framingham, MA (US); Douglas W. Young, Arlington, MA (US)

(73) Assignee: BOSE CORPORATION, Framingham, MA (US)

( * ) Notice: Subject to any disclaimer, the term of this patent is extended or adjusted under 35 U.S.C. 154(b) by 17 days.

(21) Appl. No.: 15/250,504

(22) Filed: Aug. 29, 2016

(65) Prior Publication Data

US 2018/0060021 A1 Mar. 1, 2018

(51) Int. Cl.
*G06F 3/16* (2006.01)
*H04W 76/14* (2018.01)
(Continued)

(52) U.S. Cl.
CPC ........ *G06F 3/165* (2013.01); *G06F 17/30053* (2013.01); *G06F 17/3074* (2013.01); *G06F 17/30772* (2013.01); *H04L 12/2816* (2013.01); *H04L 12/2823* (2013.01); *H04L 12/2834* (2013.01); *H04L 12/2838* (2013.01); *H04L 65/4069* (2013.01); *H04L 65/4092* (2013.01); *H04L 67/14* (2013.01); *H04L 67/143* (2013.01); *H04L 67/325* (2013.01);
(Continued)

(58) Field of Classification Search
CPC ...... G06F 3/165; H04W 4/008; H04W 76/023
USPC ........................................................ 455/41.2
See application file for complete search history.

(56) References Cited

U.S. PATENT DOCUMENTS 6,802,041 B1 * 10/2004 Rehm ............... G06F 17/30017
707/E17.009
6,839,416 B1 * 1/2005 Shaffer ................... H04M 3/56
379/202.01
(Continued)

OTHER PUBLICATIONS

International Search Report & Written Opinion in International Patent Application No. PCT/US17/43597, dated Sep. 28, 2017; 15 pages.

*Primary Examiner* — Hai V Nguyen
(74) *Attorney, Agent, or Firm* — Schmeiser, Olsen & Watts LLP

(57) ABSTRACT

A connection management system comprises a wireless speaker including first and second connectors for communicating with two selected audio content source devices, respectively, of at least three audio content source devices; a rules engine that establishes a set of conditions under which the at least three audio content source devices share the first and second connectors of the wireless speaker; and a device allocation system that forms a first communication path between one of the two selected audio content source devices and the first connector of the wireless speaker and forms a second communication path between another of the two selected audio content source devices and the second connector of the wireless speaker at a time in accordance with the set of conditions established by the rules engine.

20 Claims, 4 Drawing Sheets

(51) Int. Cl.

| | | |
|---|---|---|
| *H04W 4/80* | (2018.01) | |
| *H04W 4/00* | (2018.01) | |
| *H04W 76/02* | (2009.01) | |
| *H04L 29/08* | (2006.01) | |
| *H04L 12/28* | (2006.01) | |
| *H04L 29/06* | (2006.01) | |
| *H04M 1/725* | (2006.01) | |
| *H04N 21/218* | (2011.01) | |
| *H04N 21/262* | (2011.01) | |
| *H04N 21/41* | (2011.01) | |
| *H04N 21/482* | (2011.01) | |
| *H04N 21/61* | (2011.01) | |
| *H04N 21/647* | (2011.01) | |
| *H04N 21/81* | (2011.01) | |
| *G06F 17/30* | (2006.01) | |
| *H04W 76/36* | (2018.01) | |
| *H04W 76/15* | (2018.01) | |
| *H04W 76/10* | (2018.01) | |

(52) U.S. Cl.
CPC ..... *H04M 1/7253* (2013.01); *H04M 1/72533* (2013.01); *H04M 1/72558* (2013.01); *H04N 21/2181* (2013.01); *H04N 21/26258* (2013.01); *H04N 21/4126* (2013.01); *H04N 21/4825* (2013.01); *H04N 21/6131* (2013.01); *H04N 21/64746* (2013.01); *H04N 21/8113* (2013.01); *H04W 4/008* (2013.01); *H04W 4/80* (2018.02); *H04W 76/023* (2013.01); *H04W 76/10* (2018.02); *H04W 76/14* (2018.02); *H04W 76/15* (2018.02); *H04W 76/36* (2018.02); *H04L 67/10* (2013.01); *H04L 2012/2841* (2013.01); *H04L 2012/2849* (2013.01)

(56) References Cited

U.S. PATENT DOCUMENTS

| | | | | |
|---|---|---|---|---|
| 7,210,044 B2* | 4/2007 | Lai | ............. | H04K 1/00 713/189 |
| 8,611,521 B2* | 12/2013 | Aldrey | ............. | H04M 3/42161 379/204.01 |
| 9,203,637 B2* | 12/2015 | Bonnett | ............. | H04L 12/2697 |
| 9,742,895 B2* | 8/2017 | Gibbons | ............. | H04M 1/72527 |
| 9,851,937 B2* | 12/2017 | Jang | ............. | G06F 3/165 |
| 2003/0223604 A1* | 12/2003 | Nakagawa | ............. | H04M 1/6066 381/311 |
| 2004/0028207 A1* | 2/2004 | Kato | ............. | H04M 1/2535 379/219 |
| 2004/0162116 A1* | 8/2004 | Han | ............. | H04M 1/271 455/563 |
| 2004/0180694 A1* | 9/2004 | Lai | ............. | H04K 1/00 455/558 |
| 2005/0013102 A1* | 1/2005 | Poulsen | ............. | A47B 21/0314 361/679.55 |
| 2007/0038999 A1* | 2/2007 | Millington | ............. | H04J 3/0664 718/100 |
| 2007/0055988 A1* | 3/2007 | Iwamura | ............. | H04L 12/2803 725/37 |
| 2010/0299639 A1* | 11/2010 | Ramsay | ............. | G06F 3/0486 715/835 |
| 2012/0317243 A1* | 12/2012 | Gao | ............. | H04H 20/95 709/219 |
| 2013/0058619 A1* | 3/2013 | Miyakawa | ............. | H04N 5/77 386/225 |
| 2013/0095791 A1* | 4/2013 | Bennett | ............. | H04L 63/30 455/411 |
| 2014/0140530 A1* | 5/2014 | Gomes-Casseres | ............. | H04W 4/023 381/77 |
| 2014/0359151 A1* | 12/2014 | Hansen | ............. | H04L 65/4015 709/231 |
| 2015/0067871 A1 | 3/2015 | Commons et al. | | |
| 2015/0094834 A1* | 4/2015 | Vega | ............. | G06F 3/165 700/94 |
| 2015/0098583 A1* | 4/2015 | Millington | ............. | H04L 12/282 381/80 |
| 2015/0187199 A1* | 7/2015 | Chang | ............. | A61M 21/02 340/575 |
| 2015/0249882 A1* | 9/2015 | Patil | ............. | G10L 15/26 381/123 |
| 2016/0142821 A1 | 5/2016 | Lin et al. | | |
| 2016/0191695 A1* | 6/2016 | Gibbons | ............. | H04R 1/08 455/557 |
| 2017/0034215 A1* | 2/2017 | Sigel | ............. | H04L 63/107 |
| 2017/0180915 A1* | 6/2017 | Adhikari | ............. | H04W 4/80 |
| 2017/0223482 A1* | 8/2017 | Park | ............. | A61B 5/002 |
| 2017/0264740 A1* | 9/2017 | Bennett | ............. | H04M 3/2281 |
| 2017/0295413 A1* | 10/2017 | Vega-Zayas | ............. | H04N 21/8547 |

* cited by examiner

WIRELESS SPEAKER CONNECTION MANAGEMENT

BACKGROUND

(1) Field of the Invention

This description relates generally to stored audio content applications, and more specifically, the systems and methods for managing the output of audio content from different source devices to a speaker.

(2) Description of Related Art

Conventional wireless audio speakers may allow two mobile electronic devices such as smartphones to connect to it at any given time, but do not music collections from more than two mobile devices to be shared.

BRIEF SUMMARY

In accordance with one aspect, a connection management system comprises a wireless speaker including first and second connectors for communicating with two selected audio content source devices, respectively, of at least three audio content source devices; a rules engine that establishes a set of conditions under which the at least three audio content source devices share the first and second connectors of the wireless speaker; and a device allocation system that forms a first communication path between one of the two selected audio content source devices and the first connector of the wireless speaker and forms a second communication path between another of the two selected audio content source devices and the second connector of the wireless speaker at a time in accordance with the set of conditions established by the rules engine.

Aspects may include one or more of the following features:

The connection management system may further comprise an application module stored and executed at each of the at least three audio content source devices. Each application module may be configured to provide one end of the first or second communication path. The first connector may provide the other end of the first communication path, and the second connector providing the other end of the second communication path.

The first and second connectors and at least three audio content source devices may each include a WiFi or Bluetooth™ protocol-compliant interface.

The connection management system may further comprise a central playlist stored at a remote location that includes a designated order in which audio content stored at the at least three audio content source devices is to be output. The set of conditions of the rules engine may include an instruction to output the audio content to the wireless speaker according to the designated order.

The remote location may be a cloud-based location.

The device allocation system may output a first communication that instructs a first audio content source device of the at least three audio content source devices to stream a first content identified in the designated order of the centralized playlist to the wireless speaker. In response, the first audio content source device may form the first communication path with the first connector of the wireless speaker, and initiates the streaming of the first content to the wireless speaker.

The first communication may include a notification that identifies a second audio content source device of the at least three audio content source devices to stream a second content identified in the designated order of the centralized playlist to the wireless speaker. The first audio content source device may send a command to the wireless speaker to form the second communication path between the second connector and the second audio content source device.

The first audio content source device may send a command to the speaker to terminate the first communication path with the first connector of the wireless speaker when the streaming of the first content is completed. In response, the wireless speaker may send a command to the second audio content source device to initiate the streaming of the second content to the wireless speaker over the second communication path.

The device allocation system may output a second communication to the second device audio content source device that includes a notification that identifies a third audio content source device of the at least three audio content source devices to stream a third content identified in the designated order of the centralized playlist to the wireless speaker. The second audio content source device may send a command to the wireless speaker to form a third communication path between the first connector and the third audio content source device.

The second audio content source device may terminate the second communication path with the second connector of the wireless speaker when the streaming of the second content is completed. In response, the wireless speaker may send a command to the third audio content source device to initiate the streaming of the third content to the wireless speaker over the third communication path.

The wireless speaker may be part of a tabletop housing or a headphone.

In accordance with another aspect, a device that manages the audio output from at least three devices to a wireless speaker, the device comprises a switch that forms a first wireless path between a first of three or more audio content source devices and a first connector of a wireless speaker and forms a second wireless path between a second of three or more audio content source devices and a second connector of the wireless speaker; and an allocation device that shares the first and second wireless paths among the three or more audio content source devices with the first and second connectors of the wireless speaker.

Aspects may include one or more of the following features:

The first and second connectors and at least three audio content source devices may each include a WiFi or Bluetooth™ protocol-compliant interface.

The allocation device may output a first communication that instructs the first audio content source device to stream a first content to the wireless speaker. In response, the first audio content source device may form the first communication path with the first connector of the wireless speaker, and initiates the streaming of the first content to the wireless speaker.

The first communication may include a notification that identifies the second audio content source device to stream a second content to the wireless speaker. The first audio content source device may send a command to the wireless speaker to form the second communication path between the second connector and the second audio content source device.

The first audio content source device may send a command to the wireless speaker to terminate the first communication path with the first connector of the wireless speaker when the streaming of the first content is completed. In response, the wireless speaker may send a command to the second audio content source device to initiate the streaming of the second content to the wireless speaker over the second communication path.

The allocation device outputs a second communication to the second device audio content source device that includes a notification that identifies the third audio content source device of the at least three audio content source devices to stream a third content to the wireless speaker, wherein the second audio content source device sends a command to the wireless speaker to form a third communication path between the first connector and the third audio content source device.

The second audio content source device may terminate the second communication path with the second connector of the wireless speaker when the streaming of the second content is completed. In response, the wireless speaker may send a command to the third audio content source device to initiate the streaming of the third content to the wireless speaker over the third communication path.

In another aspect, a method for connection management between at least three audio content source devices and a wireless speaker, comprises outputting, by a device allocation system, a first communication that instructs a first audio content source device of the at least three audio content source devices to stream a first content to the wireless speaker; forming a first communication path between the first audio content source device and a first connector of the wireless speaker; initiating the streaming of the first content over the first communication path to the wireless speaker; identifying a second audio content source device of the at least three audio content source devices to stream a second content to the wireless speaker; forming a second communication path between the second audio content source device and a second connector of the wireless speaker; terminating the first communication path with the first connector of the wireless speaker when the streaming of the first content is completed; initiating the streaming of the second content over the second communication path to the wireless speaker; identifying a third audio content source device of the at least three audio content source devices to stream a third content to the wireless speaker; and forming a third communication path between the third audio content source device and the first connector.

Aspects may include one or more of the following features:

The method may further comprise terminating the second communication path with the second connector of the wireless speaker when the streaming of the second content is completed; and initiating the streaming of the third content to the wireless speaker over the third communication path.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Applications, for example, playlists, are readily available for allowing a group of people to enjoy music together by drawing from the music collections of audio or other media works, and arranging the media works, e.g., songs, for output according to user preference/or selection algorithms.

User mobile electronic devices, such as smartphones, tablets, notebooks, laptop computers, and the like, may serve as sources for the audio content, which receive a request from the playlist to play a song identified in the playlist queue. The requested song is played through wireless speakers, headphones, and the like, referred to as audio sink devices, for example, using Bluetooth™ devices. In some examples, the applications running on the audio content source devices communicate with an Internet Cloud where the central playlist may be located, so that audio streams can be provided directly to the sink device (speaker) in the designated order set in the playlist.

However, Bluetooth™-enabled, or WiFi, or other wireless sink devices such as home speakers and headphones have physical limits with respect to the number of source devices that may be connected to the speaker at any given time, for example, two concurrent connections. This can be problematic when users seek to share content from more than two source devices.

Figure 1:
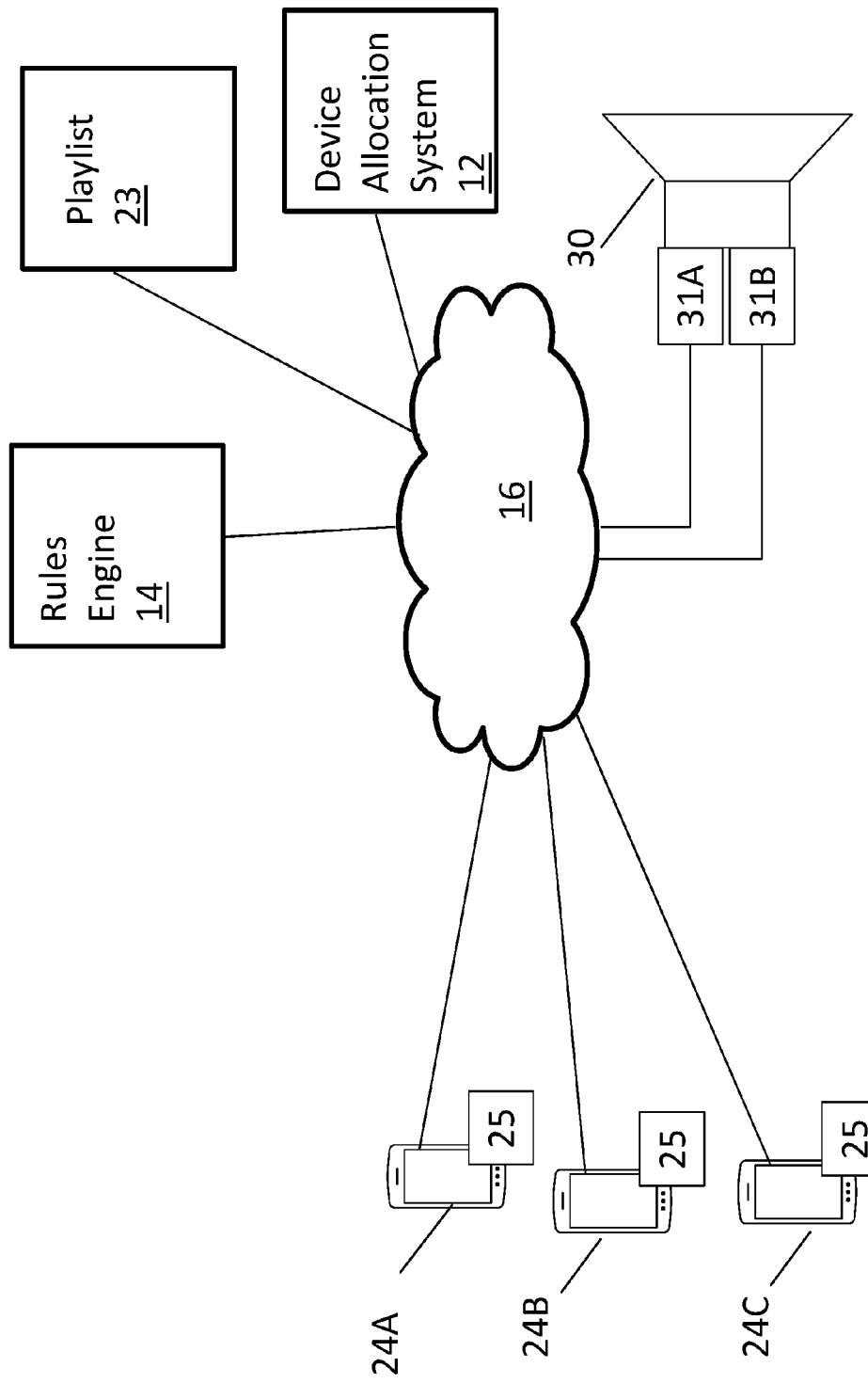
FIG. 1 depicts an example environment.

FIG. 1 depicts an example environment. The environment may include but not be limited to a plurality of audio content source devices 24A-24C (generally, 24) that share a speaker 30. Each source device 24 is configured to store audio content, for example, music stored in a digital format, or configured to access audio content stored at a remote location from the source device 24, for example, streaming songs from the Pandora™ website or the like.

In some examples, the source devices 24 may each execute an application 25 that is configured to communicate with a central playlist 23 via a network 16. This permits the central playlist 23 to serve as a queue and facilitator for directing various media works from different source devices 24 to a common speaker 30 via the network 16. Thus, the individual playlists at the source devices 24 can be "mixed" or otherwise organized for output by the central playlist 23 in a shared manner. In some examples, the application 25 includes a standalone playlist that communicates either with the central playlist 23 or the rules engine 14. The network 16 may be a public switched telephone network (PSTN), a mobile communications network, a data network, such as a local area network (LAN) or wide area network (WAN), or a combination thereof, or other communication network known to those of ordinary skill in the art. The network 16 may include a cloud computing or related Internet-based computing environment that provides shared processing resources and data to computers and other electronic devices.

The speaker 30 is preferably a wireless speaker, and may be part of a tabletop housing, for example, a sound station, speaker enclosure, or a headphone. In some examples, the speaker 30 includes two source device input connectors 31A, 31B (generally, 31). Thus, only two of the source devices 24A-C may connect with the speaker 30 at any one time. In other examples, the speaker 30 may have one input connector 31, or more than two input connectors 31.

A rules engine 14 may establish a set of conditions under which a plurality of audio content source devices 24 share the first and second connectors 31A, 31B of the speaker 30. For example, the rules engine 14 can identify which device 24 is to communicate with the speaker 30 for outputting a song or other audio. The rules engine 14 can also prioritize the output of audio files or the like to be executed, for example, according to duration of stream, type of audio, name of song, according to a predetermined priority, for example, source device 24A is a higher priority than source device 24B, and so on.

A playlist 23 may be stored at a remote location such as a remote server on a cloud computing environment. The playlist 23 alone or in combination with the rules engine 14 may establish a designated order in which audio content stored at the at least three audio content source devices 24 is to be output. In other examples, each device 24 includes a playlist, and the rules engine 14 communicates directly with the device playlists to establish the order in which songs or other media works are streamed to the speaker 30.

Device allocation system 12 forms the communication path between selected audio content source devices 24 and the connectors 31 of the wireless speaker. For example, first and second communication paths may be formed between two selected audio content source devices 24 and the first and second connectors 31A, 31B in accordance with the set of conditions established by the rules engine 14.

Figure 2:
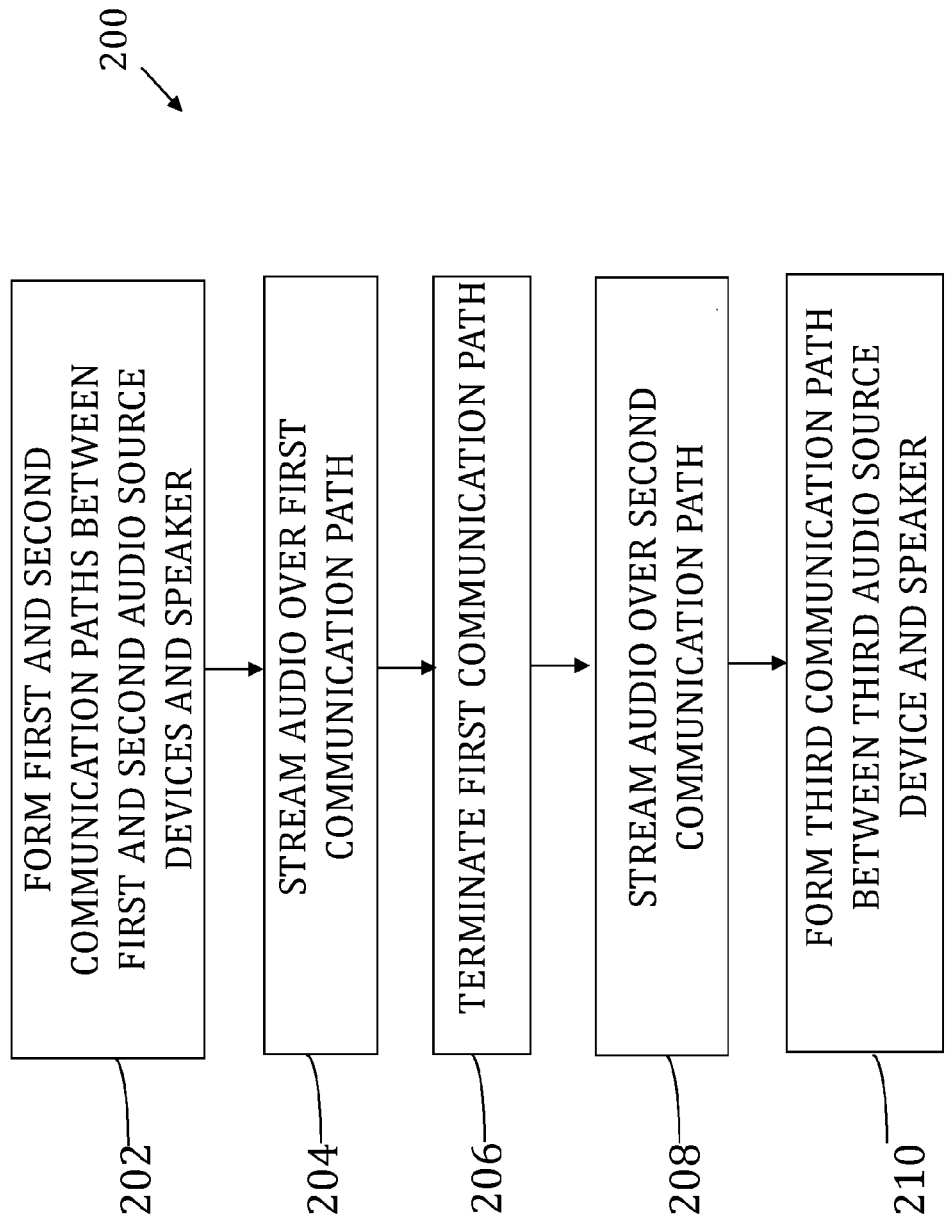
FIG. 2 is a flow diagram of a method for sharing a speaker between different source devices, in accordance with some examples.

FIG. 2 is a flow diagram of a method 200 for sharing a speaker between different source devices, in accordance with some examples For example, referring to FIG. 1, the method 200 may provide connection management between three or more audio content source devices 24A, 24B, 24C and two source device input connectors 31A and 31B of a speaker 30. Some or all of the method 200 may be executed by elements of the environment illustrated and described with respect to FIG. 1.

At block 202, a first communication path is formed between a first audio content source device 24A and the speaker 30, for example, a first source device input connector 31A of the speaker 30, and a second communication path is formed between a second audio content source device 24B and the speaker 30, for example, a second source device input connector 31B of the speaker 30.

At block 204, audio content is streamed from the first audio content source device 24A over the first communication path to the source device input connector 31A of the speaker 30.

At block 206, the first communication path is terminated when the streaming of the content from the first audio content to the speaker 30 is completed. After the first audio content source device 24A completes the streaming of the first audio content, e.g., a song, to the speaker 30, the first source device 24A may send a message to the speaker 30 instructing the speaker 30 to terminate the first communication path. The speaker 30 may generate and output a message to the second audio content source device 24B to begin streaming (block 208) its audio content, i.e., second audio content, over the second communication path to the second input connector 31B of the speaker 30. Since the second communication path is already formed, the second audio content may be streamed almost immediately after the streaming of the first audio content is completed, e.g., after the first song is played and heard from the speaker 30, the second song can be immediately or almost immediately played and heard from the speaker 30. Alternatively, the first and second audio content may be streamed at a predetermined or designated play time, for example, established by a playlist.

Prior to the completion of the streaming of the second audio content over the second communication path, the second audio source device 24B may receive a notification from the device allocation system 12 that identifies the third audio source device 24C for providing a third audio content in the queue. The second audio source device 24B may in response send a command to the speaker 30 to establish (block 210) a third communication path between the first source device input connector 31A and the third audio content device 24C. Here, the third communication path may replace the first communication path with respect to the first input connector 31A, where the third communication path extends to a different source device than that of the first communication path.

This process may be repeated for each song in a queue, for example, managed by a playlist.

Figure 3:
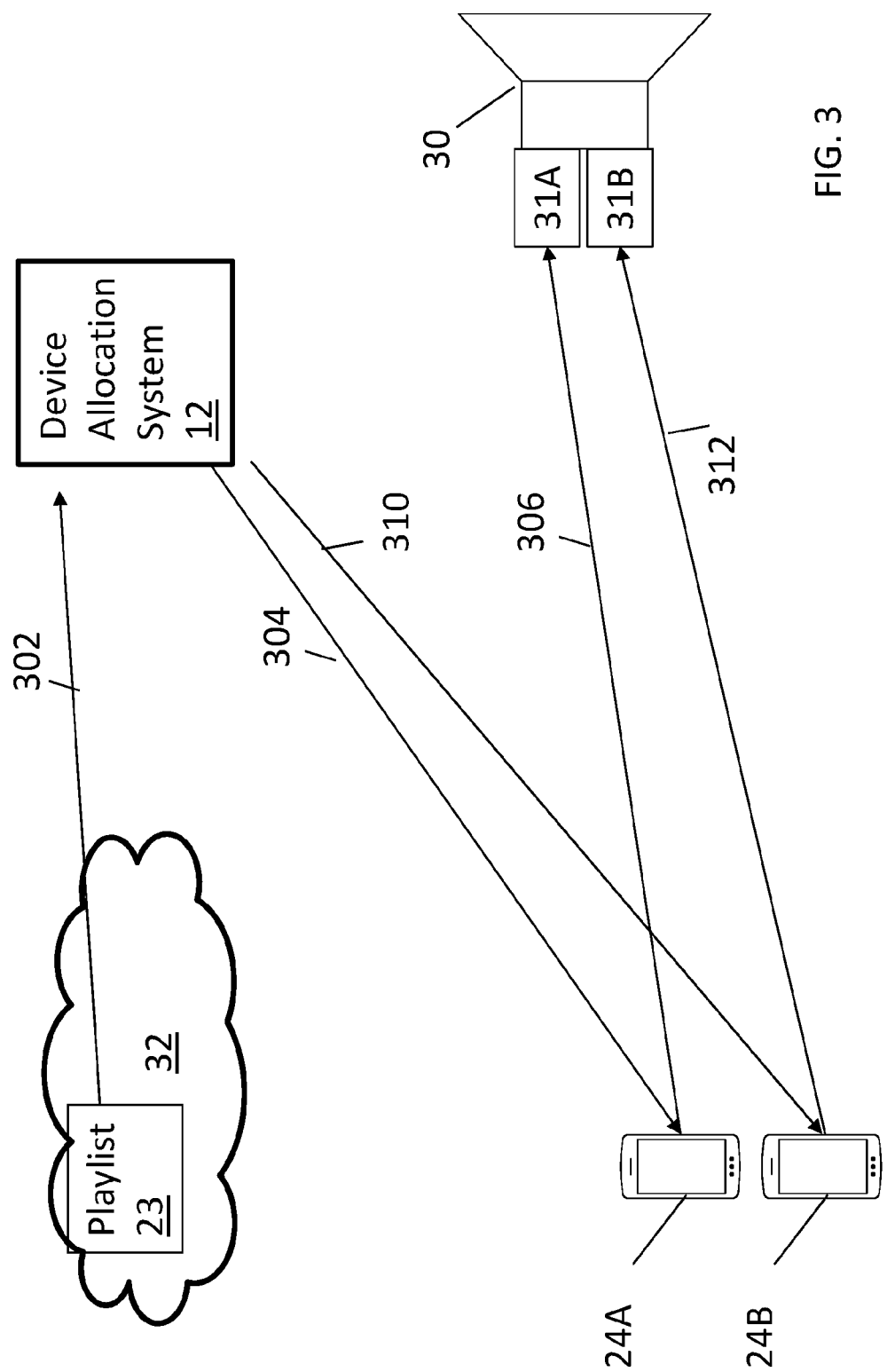
FIG. 3 depicts an example environment where a connection management system of FIG. 1 may operate, including flow arrows illustrating a relationship between elements of the connection management system during an operation.

For example, as shown in FIG. 3, a central playlist 23 may be stored at a remote location, for example, a cloud computing environment 32. The playlist 23 may include a list of recorded songs or pieces of music. The music content itself may be stored at the audio source devices 24 and streamed directly to the wireless speaker 30 in an order specified by the playlist 23. In other words, the playlist 23 may provide a designated order in which audio content, for example, music songs stored as digital media, is to be output, regardless of location of the audio content. Alternatively, the music content itself may be stored and arranged as digital files at the cloud computing environment 32. The central playlist 23 does not require that the actual media listed be conveyed with the list. Rather, the playlist 23 may be a data structure including some combination of media title, media album, media artist, media author, and the like, and may be provided in a standardized form. These data structures permit the sharing of media playlists, without the need to actually copy, distribute, or perform the media works.

During operation, the central playlist 23 can communicate with the media files and/or individual playlists stored at each audio source device 24. Accordingly, the playlist 23 may provide access of its lists (302) for the device allocation system 12, which in response outputs (304) a first communication that instructs a first audio content source device 24A to stream a first song or other audio content identified in the designated order of the central playlist 23 to a wireless speaker 30. In response to receiving the first communication, the first audio content source device 24A forms (306) a first communication path with a first input connector 31A of the wireless speaker 30, and initiates the streaming of the first audio content to the wireless speaker.

Similarly, the device allocation system 12 may output (310) a second communication that instructs a second audio content source device 24B to stream a second song or other audio content identified in the designated order of the central playlist 23 to the wireless speaker 30. The wireless speaker 30, namely, the second input connector 31B, forms a second communication path (312) with the second audio content source device 24B. According to the method 200 described in FIG. 2, the second audio content source device 24B may begin streaming the second audio content over the second communication path to the second input connector 31B of the speaker 30 after the first audio content has been streamed to the speaker 30.

As also described in the method 200, the first and/or second communication paths may be terminated, and new communication paths may be provided from other audio source devices. For example, the first audio content source device 24A or the first input connector 31A may terminate the first communication path when the streaming of the first content is completed. In other examples, the first communication path, and/or any other communication path formed between source devices 24 and the speaker 30 may be terminated by either the source device 24 or the speaker 30. Also, if a source device 24 moves outside of a connection range, or a range where a communication and streaming of audio may occur with the speaker 30, then the communication path will terminate.

In response, the wireless speaker 30 sends a command to the second audio content source device 24B to initiate the streaming of the second content to the wireless speaker over the second communication path. Also, the device allocation system 12 outputs a second communication to the second device audio content source device that includes a notification that identifies a third audio content source device, e.g., device 24C shown in FIG. 1, to stream a third audio content identified in the designated order of the centralized playlist 23 to the wireless speaker 30. The second audio content source device 24B sends a command to the wireless speaker 30 to form a third communication path between the first connector 31A and the third audio content source device 24C.

Figure 4:
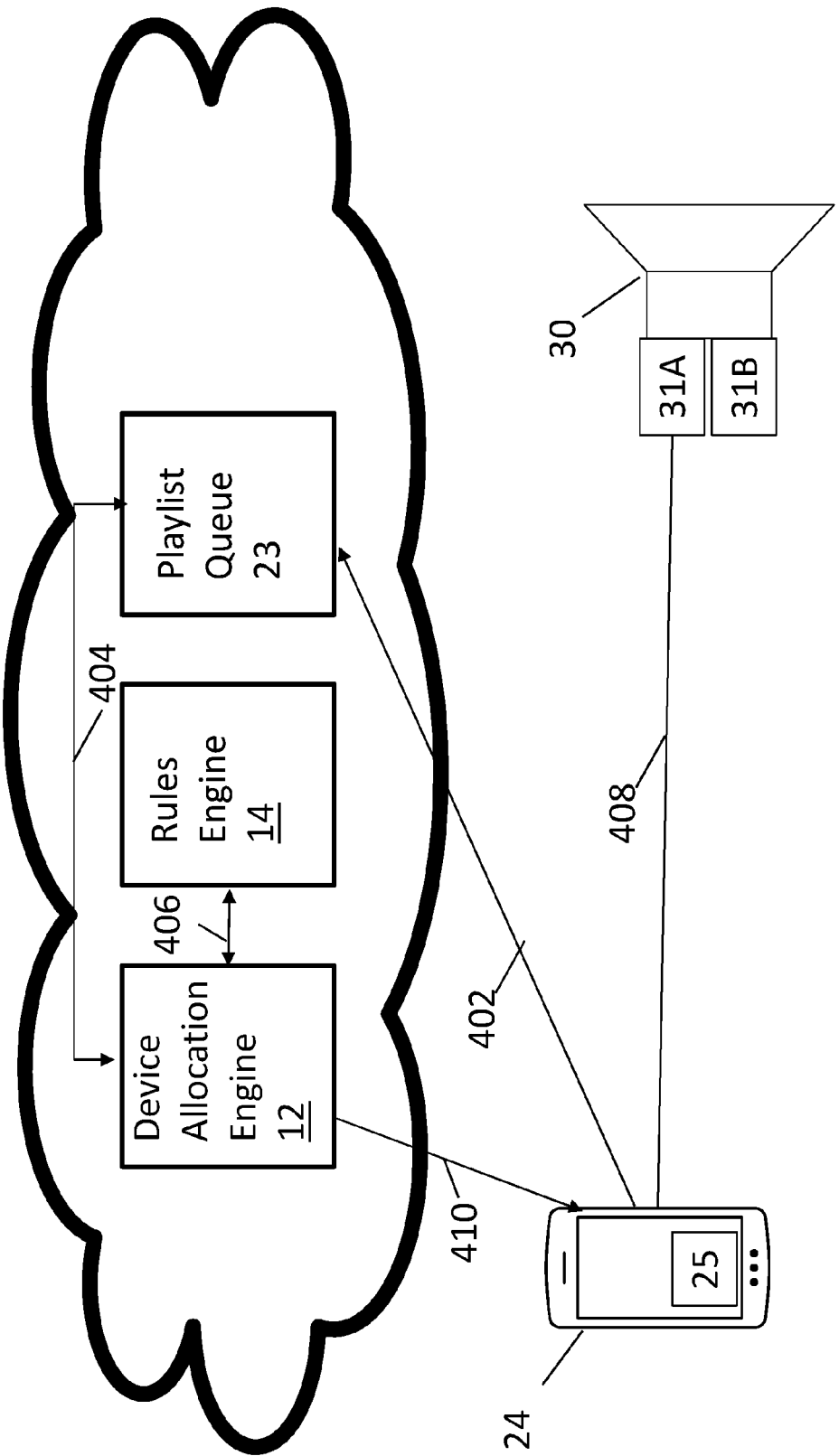
FIG. 4 illustrates an environment in which some examples can be practiced.

Referring to FIG. 4, a device allocation system 12, a rules engine 14, and a playlist queue 23, collectively referred to as a connection management system, may be present at a cloud computing environment 32 or other data processing and storage facility that permits data to be exchanged with a plurality of audio content source devices and a speaker 30 via wireless communications. Although shown separately, the device allocation system 12, rules engine 14, and playlist queue 23 may in some examples be co-located at a same hardware storage device. In some examples, the rules engine 14 is part of a central playlist and forms the organization of the queue, i.e., the order in which media works are to be output. In other examples, the playlist is not in the cloud 32, but instead each device 24 includes a playlist, and the rules engine 14 communicates directly with the device playlists to establish the order in which songs or other media works are streamed to the speaker 30.

An audio content source device 24 outputs (402) the identification of a media work, or group of media works, to a central playlist 23. The playlist 23 adds the requested media work to a queue. The media work's order in the queue may depend on a set of predetermined criteria executed at the rules engine 14. A list of media works in the queue of the playlist 23 are provided (404) from the central playlist 23 to the device allocation engine 23. The content itself is preferably stored at the audio content source devices 24 to which the playlist identifiers correspond.

The rules engine 14 may provide (406) the order in which the media works are to be played, i.e., the first song, second song, and so on, according to a predetermined criteria. For example, the rules engine 14 process a set of user-defined or pre-set criteria establishing that three songs from a playlist produced at the first audio content source device 24A are to be streamed to the speaker 30 prior to a single song being streamed from the second content source device 24B. In another example, the playlist queue 23 may output media works in the order in which the receipt of instructions to play the songs are received.

An audio content source device 24 is connected (408) to one of the two connectors 31A, 31B and is streaming a current song or other media work to the speaker 30. The source device 24 while wirelessly connected to one connector 31A of the speaker 30 receives a notification (410) from the cloud 32, e.g., the device allocation system 12 executed at the cloud 32, which other device 24 is identified for providing a next media work to the speaker 30. The sharing of the two connectors 31A, 31B can subsequently be performed, for example, according to method 200 illustrated and described with respect to FIG. 2.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:

1. A connection management system, comprising:
a wireless speaker including first and second connectors for communicating with two selected audio content source devices, respectively, of at least three audio content source devices;
a rules engine that establishes a set of conditions under which the at least three audio content source devices share the first and second connectors of the wireless speaker; and
a device allocation system that forms a first communication path between one of the two selected audio content source devices and the first connector of the wireless speaker, forms a second communication path between another of the two selected audio content source devices and the second connector of the wireless speaker at a time in accordance with the set of conditions established by the rules engine, and further replaces the first communication path with a third communication path between a different audio content source device than the one of the two selected audio content source devices and the first connector of the wireless speaker in response to the first audio content source device sending a command to the speaker to terminate the first communication path.

2. The connection management system of claim 1 further comprising an application module stored and executed at each of the at least three audio content source devices, each application module configured to provide one end of the first or second communication path, the first connector providing the other end of the first communication path, and the second connector providing the other end of the second communication path.

3. The connection management system of claim 1, wherein the first and second connectors and at least three audio content source devices each includes a WiFi or Bluetooth™ protocol-compliant interface.

4. The connection management system of claim 1, further comprising a central playlist stored at a remote location that includes a designated order in which audio content stored at the at least three audio content source devices is to be output, and wherein the set of conditions of the rules engine includes an instruction to output the audio content to the wireless speaker according to the designated order.

5. The connection management system of claim 4, wherein the remote location is a cloud-based location.

6. The connection management system of claim 4, wherein the device allocation system outputs a first communication that instructs a first audio content source device of the at least three audio content source devices to stream a first content identified in the designated order of the centralized playlist to the wireless speaker, and wherein in response the first audio content source device forms the first communication path with the first connector of the wireless speaker, and initiates the streaming of the first content to the wireless speaker.

7. The connection management system of claim 6, wherein the first communication includes a notification that identifies a second audio content source device of the at least three audio content source devices to stream a second content identified in the designated order of the centralized playlist to the wireless speaker, and wherein the first audio content source device sends a command to the wireless speaker to form the second communication path between the second connector and the second audio content source device.

8. The connection management system of claim 7, wherein the first audio content source device sends a command to the speaker to terminate the first communication path with the first connector of the wireless speaker when the streaming of the first content is completed, and wherein in response the wireless speaker sends a command to the second audio content source device to initiate the streaming of the second content to the wireless speaker over the second communication path.

9. The connection management system of claim 8, wherein the device allocation system outputs a second communication to the second device audio content source device that includes a notification that identifies a third audio content source device of the at least three audio content source devices to stream a third content identified in the designated order of the centralized playlist to the wireless speaker, wherein the different audio content source device is the third audio content source device, and wherein the second audio content source device sends a command to the wireless speaker to form the third communication path between the first connector and the third audio content source device.

10. The connection management system of claim 9, wherein the second audio content source device terminates the second communication path with the second connector of the wireless speaker when the streaming of the second content is completed, and wherein in response the wireless speaker sends a command to the third audio content source device to initiate the streaming of the third content to the wireless speaker over the third communication path.

11. The connection management system of claim 1, wherein the wireless speaker is part of a tabletop housing or a headphone.

12. A device that manages the audio output from at least three devices to a wireless speaker, the device comprising:
a switch that forms a first wireless path between a first of three or more audio content source devices and a first connector of a wireless speaker and forms a second wireless path between a second of three or more audio content source devices and a second connector of the wireless speaker; and
an allocation device that shares the first and second wireless paths among the three or more audio content source devices with the first and second connectors of the wireless speaker, and further replaces the first wireless path with a third wireless path between a third audio content source device different than the first audio content source device and the first connector of the wireless speaker in response to the first audio content source device sending a command to the speaker to terminate the first wireless path.

13. The device of claim 12, wherein the first and second connectors and at least three audio content source devices each includes a WiFi or Bluetooth™ protocol-compliant interface.

14. The device of claim 12, wherein the allocation device outputs a first communication that instructs the first audio content source device to stream a first content to the wireless speaker, and wherein in response the first audio content source device forms the first communication path with the first connector of the wireless speaker, and initiates the streaming of the first content to the wireless speaker.

15. The device of claim 14, wherein the first communication includes a notification that identifies the second audio content source device to stream a second content to the wireless speaker, and wherein the first audio content source device sends a command to the wireless speaker to form the second communication path between the second connector and the second audio content source device.

16. The device of claim 15, wherein the first audio content source device sends a command to the wireless speaker to terminate the first communication path with the first connector of the wireless speaker when the streaming of the first content is completed, and wherein in response the wireless speaker sends a command to the second audio content source device to initiate the streaming of the second content to the wireless speaker over the second communication path.

17. The device of claim 16, wherein the device allocation system outputs a second communication to the second device audio content source device that includes a notification that identifies the third audio content source device of the at least three audio content source devices to stream a third content to the wireless speaker, wherein the second audio content source device sends a command to the wireless speaker to form the third communication path between the first connector and the third audio content source device.

18. The device of claim 17, wherein the second audio content source device terminates the second communication path with the second connector of the wireless speaker when the streaming of the second content is completed, and wherein in response the wireless speaker sends a command to the third audio content source device to initiate the streaming of the third content to the wireless speaker over the third communication path.

19. A method for connection management between at least three audio content source devices and a wireless speaker, comprising:
outputting, by a device allocation system, a first communication that instructs a first audio content source device of the at least three audio content source devices to stream a first content to the wireless speaker;
forming a first communication path between the first audio content source device and a first connector of the wireless speaker;
initiating the streaming of the first content over the first communication path to the wireless speaker;
identifying a second audio content source device of the at least three audio content source devices to stream a second content to the wireless speaker;
forming a second communication path between the second audio content source device and a second connector of the wireless speaker;
terminating the first communication path with the first connector of the wireless speaker when the streaming of the first content is completed;
initiating the streaming of the second content over the second communication path to the wireless speaker;

identifying a third audio content source device of the at least three audio content source devices to stream a third content to the wireless speaker; and forming a third communication path between the third audio content source device and the first connector in response to the first audio content source device sending a command to the wireless speaker to terminate the first communication path.

20. The method of claim 19, further comprising:

terminating the second communication path with the second connector of the wireless speaker when the streaming of the second content is completed; and initiating the streaming of the third content to the wireless speaker over the third communication path.

* * * * *